United States Patent [19]

Loke

[11] 4,210,532

[45] Jul. 1, 1980

[54] WATER CONDITIONER ROTARY VALVE STRUCTURE

[76] Inventor: Harvey L. Loke, P.O. Box 128, Wells, Minn. 56097

[21] Appl. No.: 942,910

[22] Filed: Sep. 14, 1978

[51] Int. Cl.² .................... B01D 15/06; F16K 11/02
[52] U.S. Cl. ................ 210/136; 137/625.29; 210/190; 210/278; 251/249.5
[58] Field of Search ............... 137/625.29; 210/38 A, 210/136, 190, 191, 278, 288; 251/249.5

[56] References Cited

U.S. PATENT DOCUMENTS

| | | | |
|---|---|---|---|
| 1,672,430 | 6/1928 | Schnyder | 251/249.5 |
| 2,631,811 | 3/1953 | Malloy | 137/625.29 |
| 3,101,316 | 8/1963 | Rose | 210/38 A |
| 3,476,151 | 11/1969 | Hegstad | 137/625.29 |
| 4,105,555 | 8/1978 | Pease | 210/136 |

*Primary Examiner*—Ivars C. Cintins
*Attorney, Agent, or Firm*—Clarence A. O'Brien; Harvey B. Jacobson

[57] ABSTRACT

A combined closure and rotary water valve assembly provided for closing the open upper end of a water softener mineral tank to be used in conjunction with a brine water tank including a float valve controlled brine water outlet and water supply line from the brine tank to the valve assembly. The valve assembly comprises a four position, five function valve. The five functions of the valve include a service function during which hard water enters the mineral tank and is softened therein and is thereafter discharged from the tank, a backwash function during which the bed of minerals within the tank is backwashed, a brine function in which brine is flushed through the mineral bed, a slow rinse function for flushing the brine is from the mineral bed and a combined rapid rinse and brine tank refill function during which the mineral bed is rapidly rinsed with water and the supply of water within the brine tank is replenished. These five functions of the valve assembly are sequentially performed as a result of a rotary actuator of the valve assembly being sequentially angularly advanced in one direction of rotation thereof.

6 Claims, 17 Drawing Figures

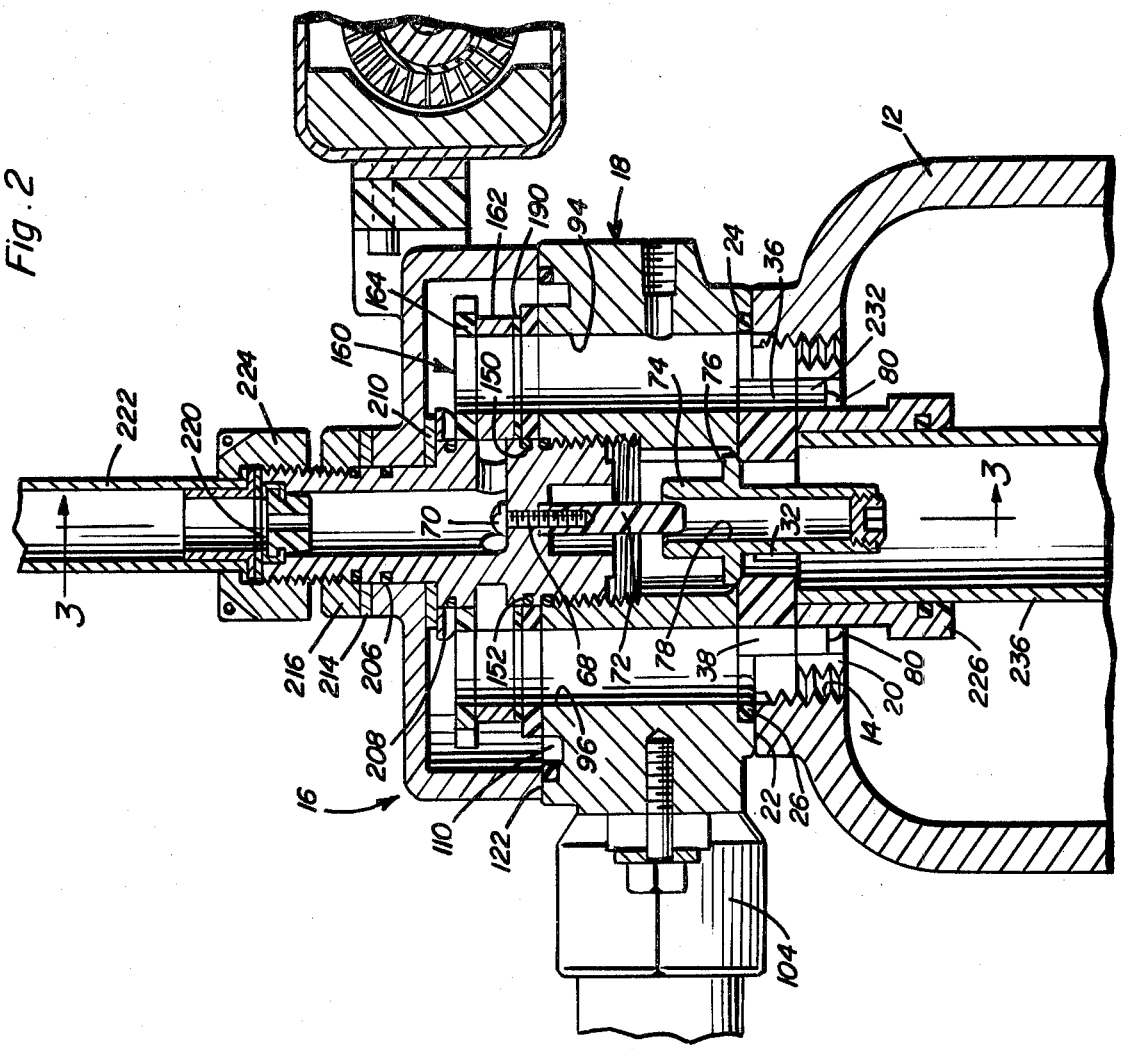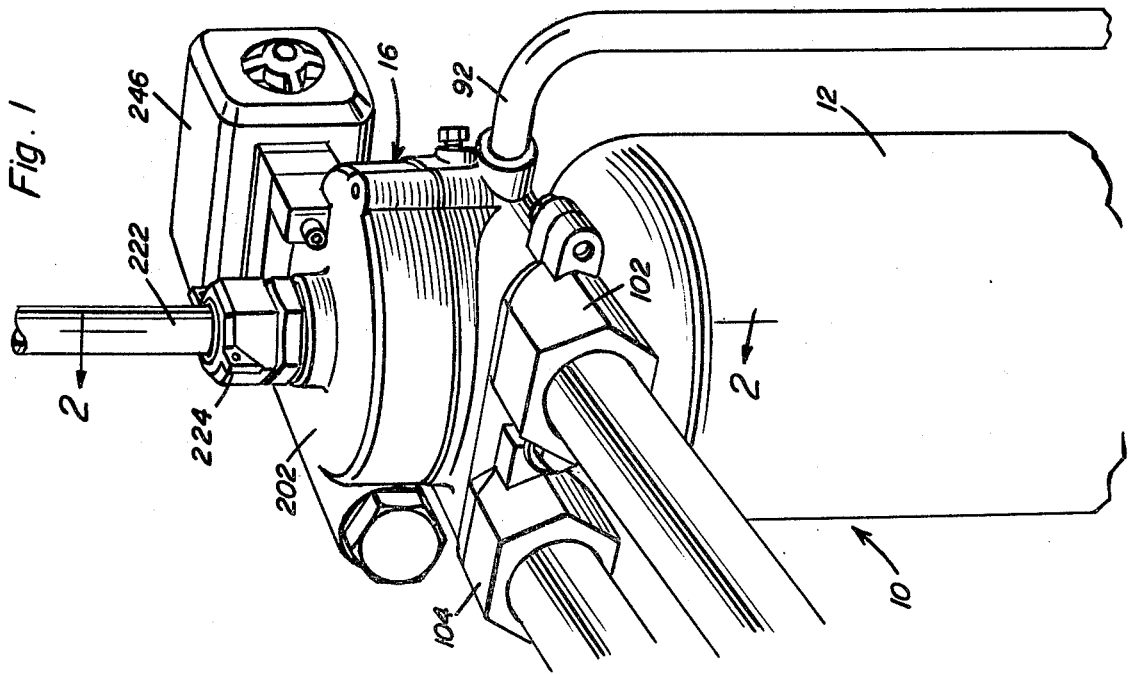

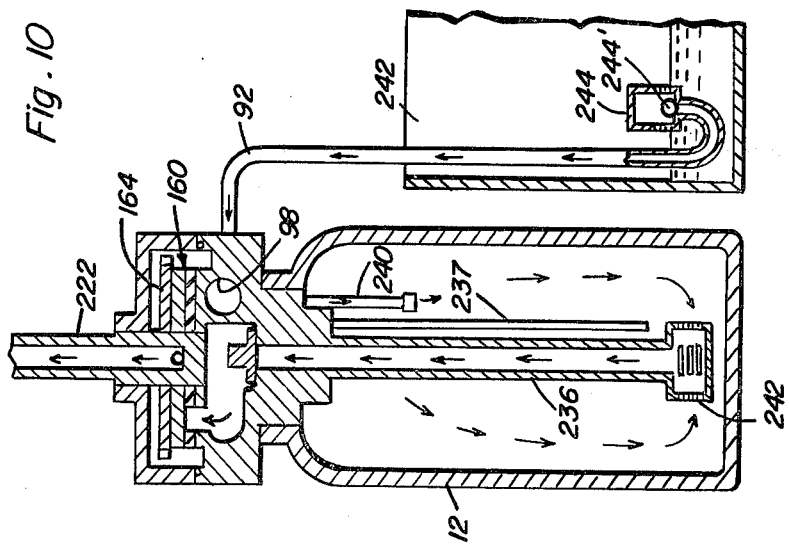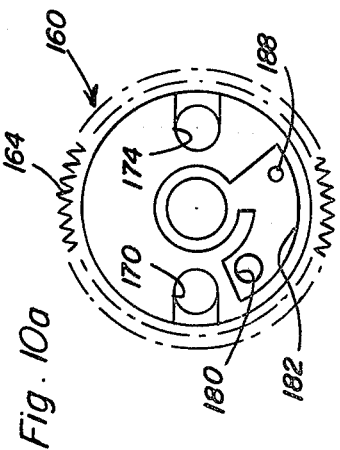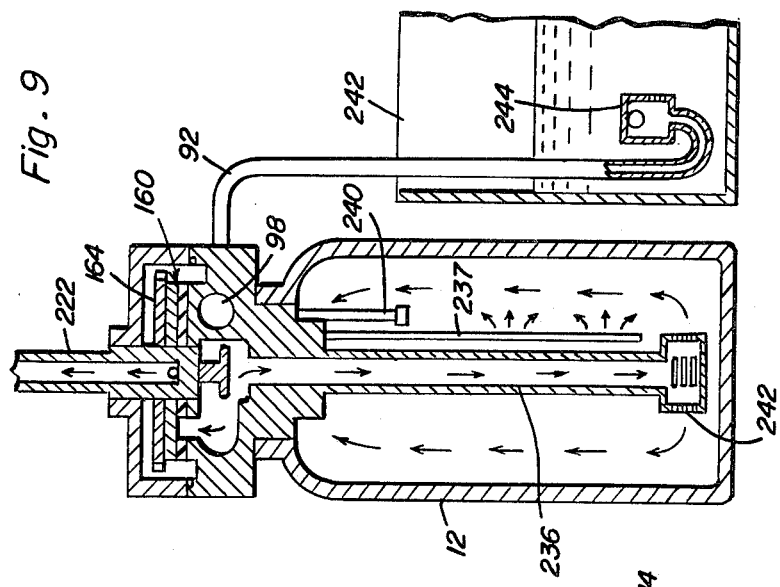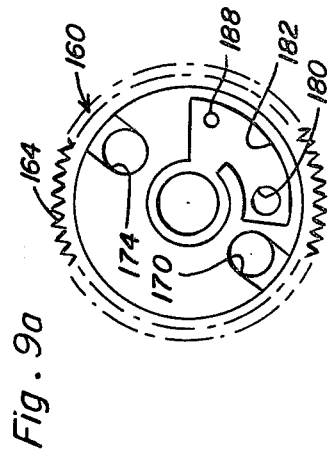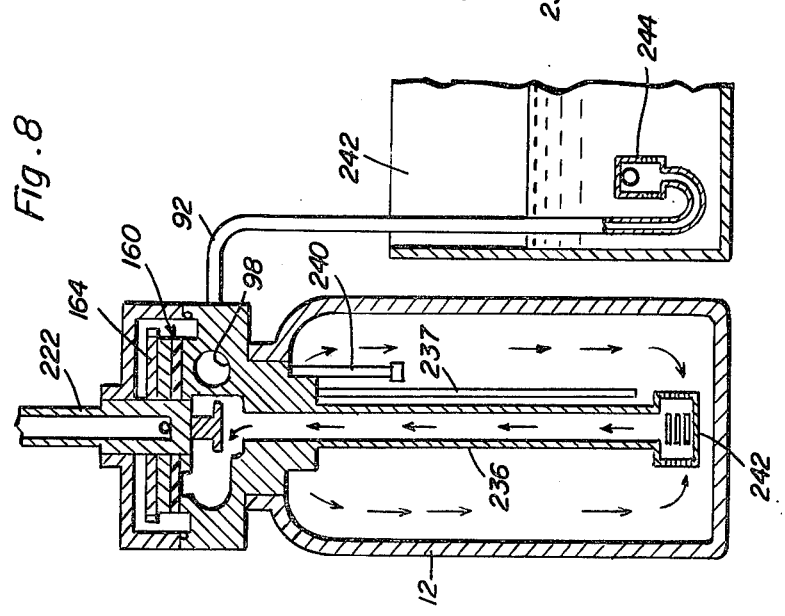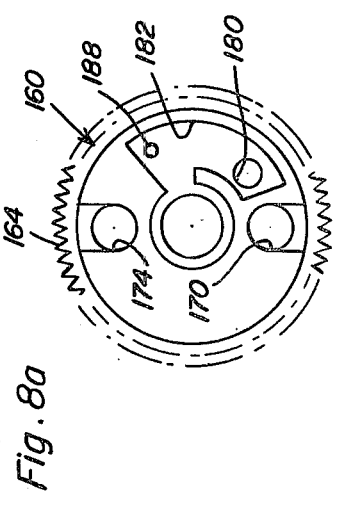

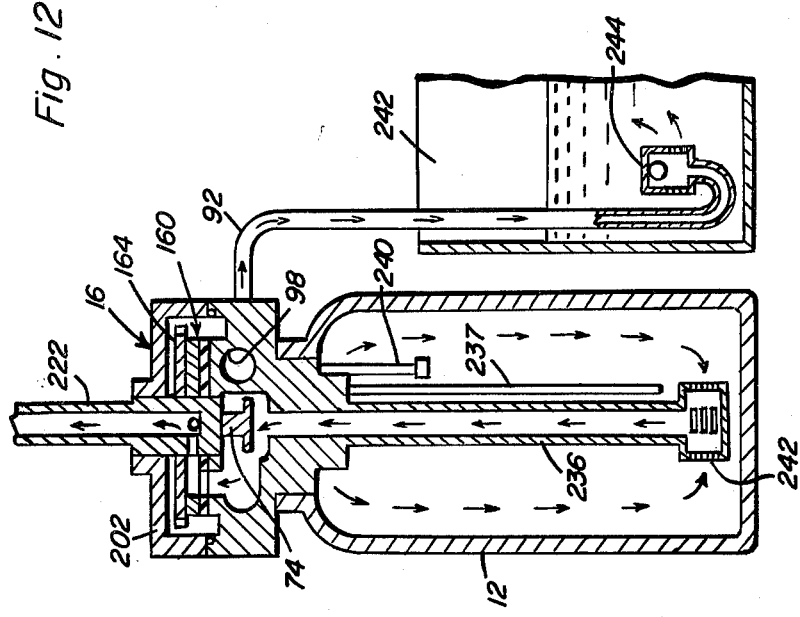
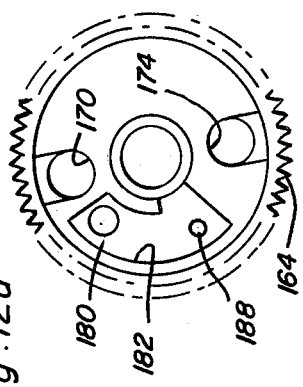
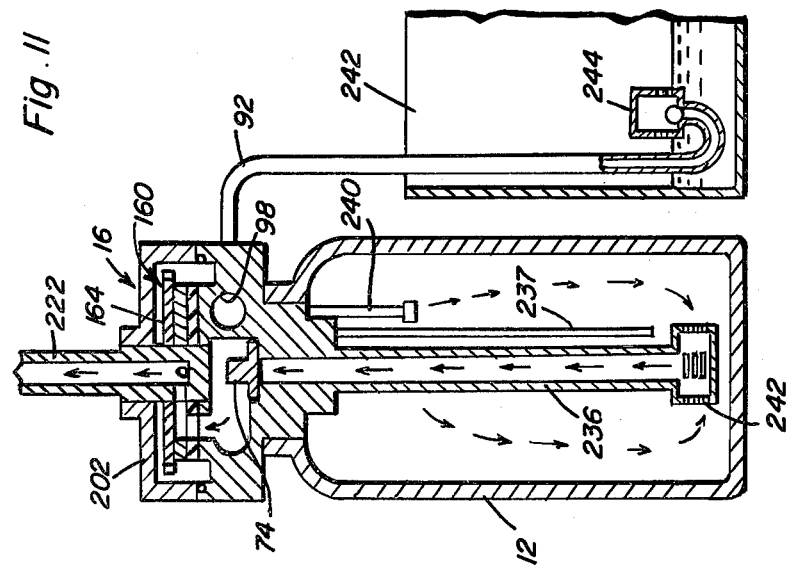
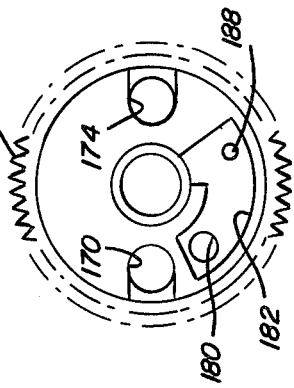

WATER CONDITIONER ROTARY VALVE STRUCTURE

BACKGROUND OF THE INVENTION

Various forms of rotary valves for water conditioning apparatuses have been heretofore provided. However, these previously known forms of rotary valves do not include structure whereby five different functions thereof are performed as a result of four positions of adjustment of the valve structure and many of the previously known valve structures do not include structure capable of performing as many as five functions.

Most existing water conditioning systems capable of service, backwash, brine, rinse and flushing functions include complicated valving requiring careful attention during each of the multiple functions thereof. Therefore, a need exists for a water conditioning system valve structure which may be readily successively actuated to effect as many as four or five successive functions of the associated water conditioning structure.

Examples of various valving structure for use in conjunction with water conditioning systems and the like are disclosed in U.S. Pat. Nos. 1,707,692, 2,093,692, 2,146,983, 2,598,632, 3,335,752, 3,433,259 and 3,465,880.

BRIEF DESCRIPTION OF THE INVENTION

The rotary valve structure of the instant invention is adapted to be utilized as a closure for the open upper end of a mineral tank and to function, in conjunction with a brine water tank, in five different modes including a service mode, a backwashed mode, a brine mode, a slow rinse mode and a rapid rinse and brine tank refill mode. The valve assembly is constructed in a manner so as to be motor driven and the driving motor for the valve may include appropriate timing mechanism associated therewith in order to enable automatic cycling of the valve assembly through the various functions thereof.

The main object of this invention is to provide a combined closure and rotary valve assembly for the upper end of a mineral tank and constructed in a manner whereby multiple successive modes of operation of the valve assembly may be accomplished each time integral of operation of the associated water conditioning unit requiring servicing of the unit.

Another object of this invention, in accordance with the immediately preceding object, is to provide a rotary valve assembly which is particularly well adapted to be motor driven.

Yet another object of this invention is to provide a rotary valve assembly in accordance with the preceding objects and which may be readily disassembled for service thereon.

A final object of this invention to be specifically enumerated therein is to provide a rotary valve construction which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the rotary valve assembly of the instant invention in operative association with the top of a mineral tank;

FIG. 2 is an enlarged fragmentary, vertical sectional view taken substantially upon the plane indicated by the section line 2—2 of FIG. 1;

FIG. 8 is a vertical, sectional schematic view of the valve assembly and mineral tank illustrating the valve assembly in the service position mode thereof;

FIG. 8a is a schematic planned view illustrating the position of the rotary valve component when in the service mode position illustrated in FIG. 8;

FIGS. 9 and 9a are views similar to FIGS. 8 and 8a but illustrating the valve assembly components in the backwashed mode positions;

FIGS. 10 and 10a are further schematic views similar to FIGS. 8 and 8a with the valve components in the brine mode positions of operation;

FIGS. 11 and 11a are Figures similar to FIGS. 8 and 8a but illustrating the components of the valve in the slow rinse mode positions thereof; and FIGS. 12 and 12a are further schematic views illustrating the valve components in the rapid rinse and brine tank refill mode positions.

DETAILED DESCRIPTION OF THE INVENTION

Figure 4:
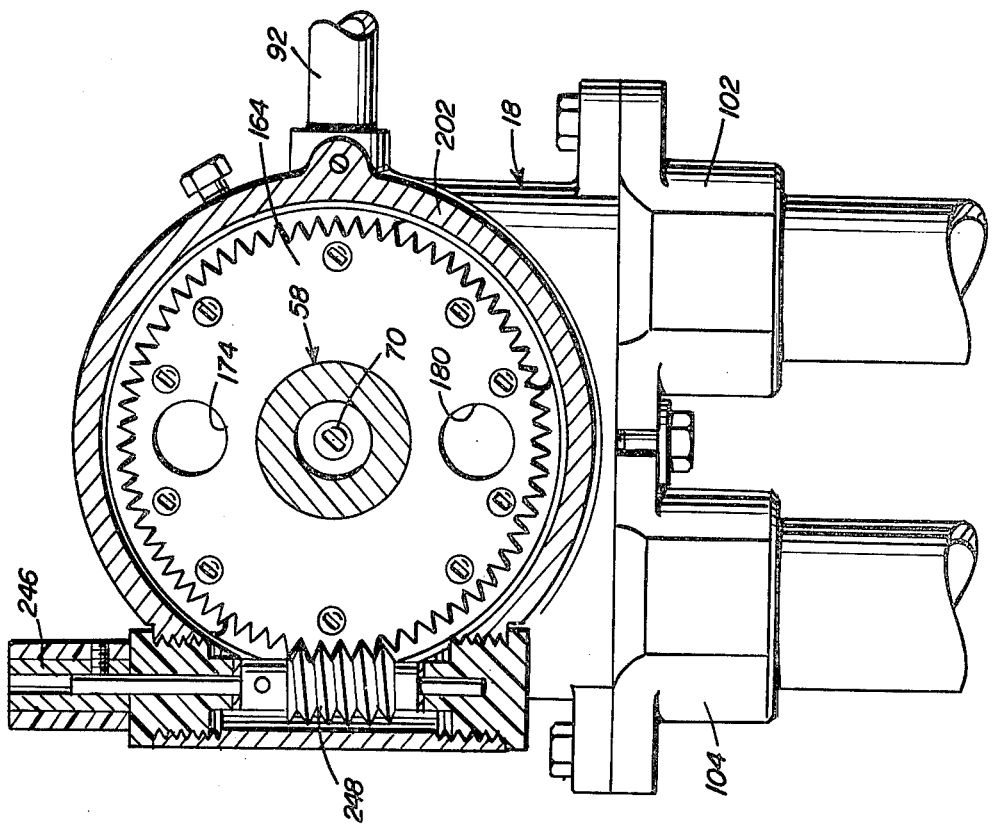
FIG. 4 is a horizontal sectional view taken substantially upon the plane indicated by the section line 4—4 of FIG. 3.
Figure 3:
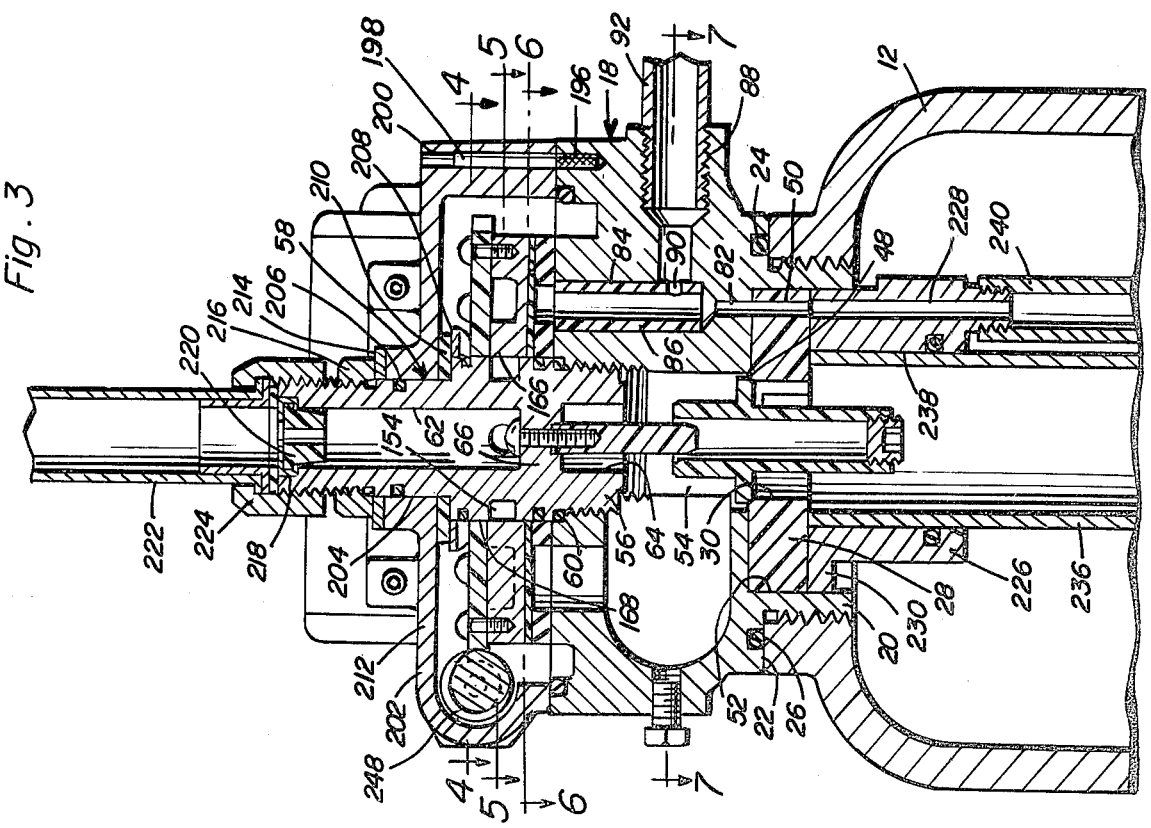
FIG. 3 is a vertical sectional view taken substantially upon the plane indicated by the section line 3—3 of FIG. 2.

Referring now more specifically to the drawings, the numeral 10 generally designates a water conditioner including a mineral tank 12 having an open internally threaded neck 14 in which the rotary valve assembly of the instant invention referred to in general by the reference numeral 16 is threadedly engaged.

The rotary valve assembly 16 includes a main valve housing referred to in general by the reference numeral 18 and the housing 18 includes a central downwardly projecting segmental externally threaded neck 20 removably threadedly engaged within the internally threaded neck 14 of the mineral tank 12. The housing 18 includes a downwardly facing abutment shoulder 22 outwardly of the neck 20 and below which the latter extends. The surface 22 includes an annular O-ring groove 24 in which an O-ring 26 is disposed forming a fluid-tight seal between the lower end of the housing 18 and the upper end of the neck 14.

A bottom route plate 28 having a central bore 30 formed therethrough is seated upwardly within the upper end of the neck 20 and the route plate includes radially downwardly opening grooves 32 and 34 formed in the underside thereof and opening into the bore 30. In addition, the route plate 28 has diametrically opposite notches 36 and 38 formed therein for a purpose to be hereinafter more fully set forth and further includes bores 40 and 42 formed therethrough which open through the remote ends of the grooves 32 and 34 and are in alignment with vertical bores 44 and 46 formed through the housing 18.

The upper side of the route place 28 about the bore 30 is bevelled as at 48 and the route plate 28 further is provided with a vertical bore 50 therethrough.

The plate 28 seats in the upper end of the counter bore 52 defined within the neck 20 downwardly of the lower end a central bore 54 formed through the housing 18. The upper end of the bore 54 is internally threaded and has the lower diametrically reduced and externally threaded end 56 of a rotary stem 58 threadedly engaged therein, the rotor stem 58 being sealingly secured to the upper end of the housing 18 about the bore 54 by means of an O-ring 60.

The upper end of the rotor stem 58 includes an upwardly opening blind bore 62 and the lower end of the rotary stem 58 includes a downwardly opening blind bore 64, a horizontal web portion 66 being defined between the lower and upper ends of the bores 62 and 64. The web 66 has a threaded bore 68 formed therethrough and a fastener 70 threaded secures the upper end of a guide pin 72 within the upper end of the blind bore 64.

An upstanding check valve 74 is provided and includes a circumferentially extending and radially outwardly projecting flange 76 intermediate its upper and lower ends and the check valve 74 defines an upwardly opening blind bore 78 in which the lower end of the guide pin 72 is loosely received. The outer periphery of the flange 76 is bevelled to conform to the bevelling as at 48 and the flange 76 is thereby seatingly engageable with the bevelled portion 48 of the route plate 28 disposed about the upper end of the bore 30.

The route plate 28 is secured within the blind bore 52 by means of pairs of threaded fasteners 80 disposed on opposite sides of the notches 36, the fasteners 80 passing upwardly through bores provided therefor in the route plate 28 and threadedly secured in threaded downwardly opening blind bores (not shown) formed in the housing 18.

The housing 18 further includes a vertical bore 82 formed therethrough in alignment with the bore 50 formed through the route plate 28 and the upper end of the bore 82 includes a diametrically enlarged counterbore 84 in which a brine injector sleeve 86 is seated, the housing 18 including an internally threaded lateral port 88 formed therein which opens into the interior of the sleeve 86 by means of a radial bore 90 formed therein. One end of a brine line 92 is threaded into the lateral port 88 from the exterior of the housing 18.

The housing 18 further has a pair of vertical passages 94 and 96 formed therethrough with which the notches 36 and 38 are registered and the housing 18 further includes inlet and outlet ports 98 and 100 opening laterally thereinto. The inlet and outlet ports 98 and 100 have external pipe fittings 102 and 104 operatively associated therewith and secured over the corresponding side of the housing 18. Sealing washers 106 and 108 are utilized between the fittings 102 and 104 and the adjacent ends of the ports 98 and 100.

The upper end of the housing 18 includes an upwardly opening annular groove 110 formed therein and the inlet port 98 is communicated with the groove 110 by means of a vertical slot 112 formed in the housing 18.

In addition, the housing 18 includes a vertical slot 114 formed in its upper surface which opens downwardly into the outlet port 100 and the outlet port 100 also opens into the bore 54 by means of a lateral passage 116.

The housing 18 includes a horizontal hard water port 118 formed therein threaded at its outer end and opening into the lower end of a vertical passage 120 formed in the housing 18 and opening upwardly through the upper surface 122 thereof. Further, the housing 18 includes a vertical primed brine refill port 124 formed therein into which a horizontal transverse automatic by-pass port 126 formed in the housing 18 opens. Also, the housing 18 has a lateral port 128 formed therein opening into the inner end of the outlet port 100. Still further, the housing 18 has a lateral port 130 formed therein which opens into the passage 94 and is removably closed by a threaded plug 131.

Positioned on the upper surface 122 of the housing 18 is a rubber wear plate 132 and the wear plate 132 includes openings 134, 136, 138, 140, 142, 144, 146 and 148 formed therethrough registered with the passages 94, 96, the counterbore 84, the passage 114, the passage 124, the bore 44, the bore 46 and the passage 120, respectively. The rotor stem 58 includes a circumferential groove 150 above the seal 60 in which a further seal 152 is seated for forming a fluid type seal between the rotor stem 58 and the central bore 154 formed in the rubber wear plate 132 and the stem 58 further includes a circumferential groove 154 and three equally angularly spaced generally radial passages 156 opening outwardly from the inner end of the blind bore 62 into the groove 154.

A rotor assembly referred to in general by the reference numeral 160 is provided and the rotor assembly 160 includes a rotor disc 162 having a worm wheel 164 secured on its upper surface. The rotor disc 162 and worm wheel 164 are provided with coextensive central bores 166 and 168 in which the rotor stem is rotatably received for rotation of the rotor assembly 160 relative to the stem 58 and the rotor disc 162 includes a vertical opening 170 formed therethrough including an upwardly opening radial port 172 opening into the open 170 through the side wall of the disc 162. The gear wheel 164 includes an opening 174 formed therethrough registered with the opening 170 and the side of the disc 162 remote from the opening 170 has a similar opening 176 formed therein with which a radial port 178 corresponding to the port 172 communicate. Further, the worm wheel 164 includes an opening 180 formed therethrough registered with the opening 176. Also, the rotor disc 162 includes a peripherally extending passage 182 formed therein beneath the worm wheel 164 and including peripherally spaced portions thereof opening into the bore or central opening 166 as at 184 and 186. Also, the rotor disc 162 includes a passage 180 formed therethrough opening into the passage 182 from the underside of the disc 162 and a small diameter passage 188 formed therein opening into the passage 182 from beneath the rotor disc 162. The underside of the rotor disc 162 is provided with an anti-friction layer 190 for anti-friction sliding engagement with the upper surface of the rubber wear plate 132 and the layer 190 includes openings formed therethrough registered with the openings 170 and 176, the passage 180 and the passage 188.

A positioning pin 192 is provided and seated in a blind bore provided therefor in the upper surface 122 of the housing 18. The pin 192 projects upwardly from the surface 122 and is received in a bore 194 formed in the rubber wear plate 132. Also, the housing 18 includes a second blind bore 196 formed therein opening upwardly through the upper surface 122 thereof and a positioning pin 198 is seated in the bore 196 and received in a bore 200 formed in a downwardly opening cover 202 secured over the upper end of the housing 18.

The downwardly opening cover 202 encloses the rotor assembly 160 therein and the upper end of the rotor stem 58 is received upwardly through a central bore 204 formed in the cover 202. The stem 48 includes an O-ring 206 within the bore 204 and a composition washer 208 as well as a wave type thrust washer 210 are disposed about the stem 58 between the latter and the top wall 212 of the cover 202. A washer 214 is disposed about the stem 58 above the cover 202 and a thrust nut 216 is threadedly engaged on the stem 58 above the washer 214. Also, the upper end of the bore 62 includes a counterbore 218 in which a flow restricting valve 220 is seated and the inlet end of a drain line 222 is coupled to the upper end of the stem 58 above the low restricting valve 220 by means of a compression nut 224.

The lower end of the neck 20 of the housing 18 has a tubular fitting 226 secured therein and the fitting 226 includes a vertical passage 228 registered with the lower end of the bore 50. The fitting 226 includes a upper radially outwardly projecting flange 230 through the which the fasteners 80 are secured and diametrically opposite sides of the flange 230 are provided with notches 232 registered with the notches 36 whereby the lower ends of the passages 94 and 96 are unobstructed and open downwardly into the interior of the mineral tank 12. In addition, a center tube or standpipe 236 has its upper end frictionally secured within a central bore 238 formed in the fitting 226. Also, the fitting 226 includes a vertical passage 235 (see FIG. 6) formed therethrough below and aligned with the lower end of bore 40 formed in route plate 28 and the upper end of a longitudinally slotted upstanding swirl tube 237 is communicated with the lower end of passage 235. The lower end of the check valve 74 projects downwardly through the bottom route plate 28 and into the upper end of the center tube or standpipe 236.

The lower end of the passage 228 has a downwardly projecting brine injection tube 240 communicated therewith and the end of the brine line 92 remote from the housing 18 opens upwardly into a brine tank 242 through a float-type check valve assembly 244. The cover 202 supports a selectively operable electric motor 246 including a rotary output shaft upon which a worm gear 248 is mounted and meshed with the worm wheel 164.

Figure 5:
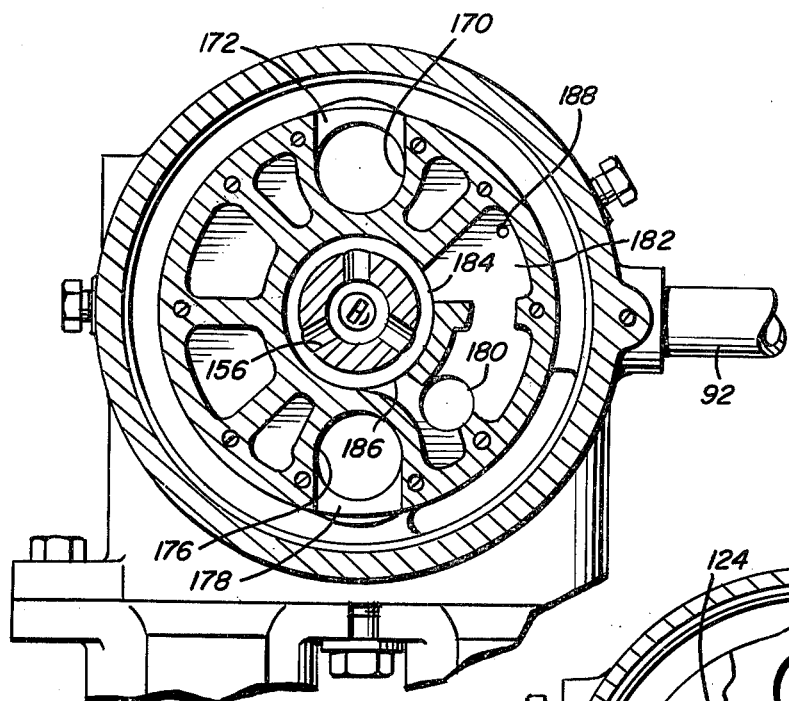
FIG. 5 is a horizontal sectional view taken substantially upon the plane indicated by the section line 5—5 of FIG. 3.
Figure 6:
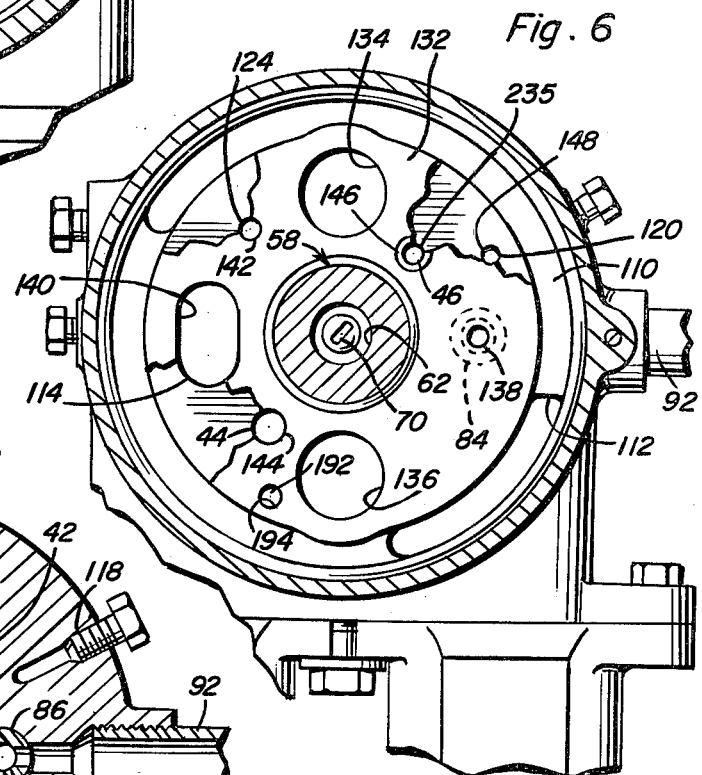
FIG. 6 is a horizontal sectional view taken substantially upon the plane indicated by the section line 6—6 of FIG. 3.
Figure 7:
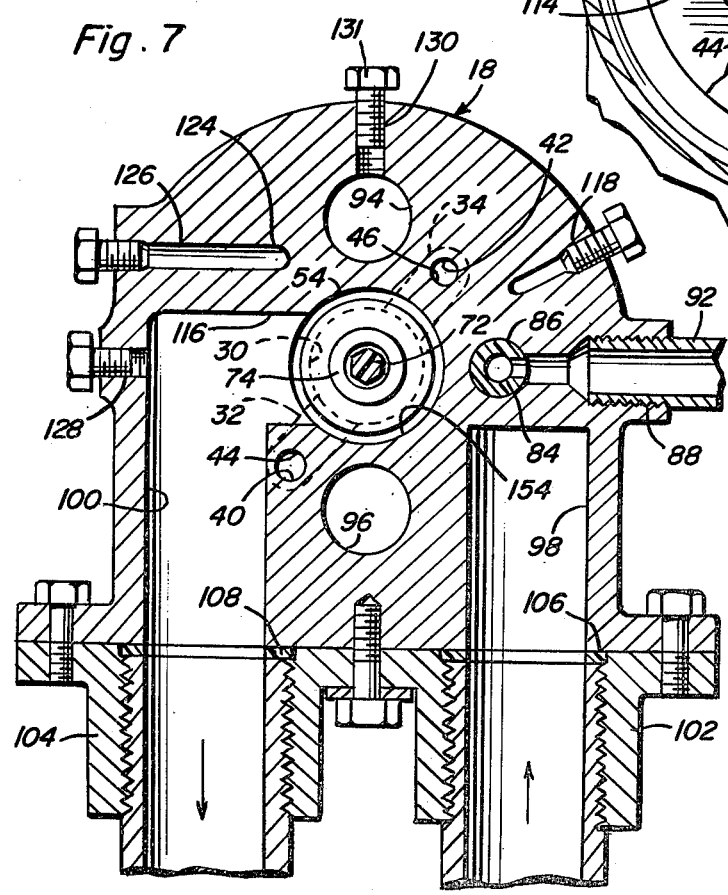
FIG. 7 is a horizontal sectional view taken substantially upon the plane indicated by the section line 7—7 of FIG. 3.

In operation, when the rotor assembly 160 is in the position illustrated in FIG. 8a of the drawings (with the understanding that the rotor assembly 160 is oriented in the same position relative to the various views of FIGS. 5, 6 and 7), hard water enters the inlet passage 98 and passes upwardly through the slot 12 and thereafter down through both service ports or passages 94 and 96 and into the upper portion of the interior of the mineral tank 12. The hard water passes downwardly through the mineral bed and thereafter inwardly through the slotted hollow head 242 carried by the lower end of the standpipe 236. The water then passes upwardly through the standpipe and thereafter upwardly displaces the check valve 74 and passes into the bore 54, through the lateral passage 116 and into the outlet port 100 before passing outwardly of the latter. In the position of the rotor assembly 160 illustrated in FIG. 8a of the drawings, the valve assembly is considered to be in the "service position."

With reference now more specifically to FIG. 9a of the drawings, when the rotor assembly 160 is rotated approximately 40 degrees in a clockwise direction from the position thereof illustrated in FIG. 8a, the hard water enters the inlet 98 and passes upwardly into the interior of the cover 202 through the slot 112. The water then passes downward through openings 134 and 136 and inwardly through radial ports 172 and 178 and thereafter downwardly through openings 170 and 176, ports 46 and 44 and bores 42 and 40 into grooves 34 and 32. Then, the water passes downwardly from the port 44 through the standpipe 236 from the port 46 through the longitudinally slotted swirl tube 237. The liquid then passes upwardly through the port 96, opening 136, passage 182, opening 184, groove 154, radial passages 156 and upwardly through bore 62 and drainline 222. Also, the water pressure operates an optional power lockout valve (not shown) by liquid flow down through opening 174, opening 170, opening 148, passage 120 and port 118. Further, water supplied to outlet 100 through both ports 44 and 46, grooves 34 and 32 and lateral passage 116 for raw water bypass, if needed.

When the rotor assembly 160 is rotated further clockwise to the position thereof illustrated in FIG. 10a, liquid flows down through opening 170, opening 176 and into raw water outlet 100, if needed. Also, the check valve 74 is held in the closed down position and liquid flows through opening 174, opening 138, brine ejector sleeve 86, bore 82, drain line 222 and ejection tube 240, liquid flow through sleeve 86 causing brine from brine tank 242 to be drawn upwardly through brine line 92, through radial bore 90 and into sleeve 86. The liquid with the brine mixed therewith then passes downward through the injection tube 240 and into the interior of the tank 12. The liquid then passes upwardly through standpipe 236, groove 32, port 44, opening 144, opening 180, passage 182, opening 184, groove 154, radial passages 156 and upward through bore 62 and drain line 222. After the brine level within the tank 242 drops from the position thereof illustrated in FIG. 9a to the positions illustrated in FIGS. 10a and 11a, the water flow through the valve assembly 16 is the same as it is in FIG. 10a, except that the float ball valve 244' of the brine tank check valve 244 drops to the close position of FIG. 10 preventing air from being drawn into the tank 12 and liquid flow through the tank 12 is reduced by approximately one-third.

Thereafter, when the rotor assembly is rotated still further in a clockwise direction to the position illustrated in FIG. 12a, openings 170 and 174 are positioned approximately one-third over openings 134 and 136. Liquid flows down through openings 134 and 136 up through standpipe 263 lifting and thus opening valve 174. The liquid then passes up through openings 140 and 180, opening 184, groove 154, radial passages 156 and upward through bore 62 and drain line 222. Port 126 is used as an optional fresh water refill for the brine tank 242 and port 128 may have a drain valve (not shown) secured therein for obtaining a test sample of softened water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a water conditioning container for water conditioning minerals, a rotary valve structure including a valve body having flow passages formed therethrough opening through first and second opposite ends of said body, first and second passage defining end members secured over said first and second ends, respectively, a rotary valve member interposed between said first end member and said first end and journaled from the latter for angular displacement about an axis extending between said ends, said second end being secured in an opening formed in said container and opening into an upper portion of the interior thereof, said body including inlet and outlet ports formed therein as well as a brine port formed therein and said body including means defining a drain port opening outwardly thereof through said first end member, said rotary valve member, said second end member, and said valve body including selectively registrable passages, upon positioning of said rotary valve member in successive first, second and third angularly displaced positions relative to said valve body operative to (1) communicate said inlet port with an upper portion of the interior of said container and a lower portion of the interior of said container with said outlet port, (2) communicate said inlet port with said lower portion of the interior of said container and said upper portion of the interior of said container with said drain port, and (3) communicate said inlet with said upper portion of the interior of said container through a venturi area with which said brine port is communicated and communicate said lower portion of said container with said drain port, said container including an elongated zone of the interior thereof extending along a path extending between the upper and lower portions of said container interior, said selectively registrable passage, when said rotary valve member is in said second position, only, also including means operative to discharge jets of the liquid flowing through said container horizontally laterally outwardly from said path at points spaced therealong and extending in generally the same horizontal direction away from said path.

2. The combination of claim 1 wherein said selectively registrable passages, upon further angular displacement of said rotary valve member in said one direction to a further angularly displaced position thereof, are operative to communicate said inlet port with said upper portion of the interior of said container and said lower portion of the interior of said container with said drain port for velocity restricted flow through the interior of said container.

3. The combination of claim 2 wherein said selectively registrable passages, upon positioning of said rotary valve member to a fourth angularly displaced position thereof, are operative to communicate said inlet port with said upper portion of the interior of said container and also with said brine port for controlled outflow of inlet water through said brine port as well as flow of inlet water into said upper portion of the interior of said container and communicate said lower portion of the interior of said container with said drain line for unrestricted flow of inlet water through the interior of said container.

4. The combination of claim 3 wherein said angularly displaced positions are angularly displaced apart a total of less than 360 degrees of rotation of said rotary valve body.

5. The combination of claim 4 wherein said second passage defining end member includes a pair of opposite side passages extending therethrough and a central through passage intermediate said opposite side passages.

6. The combination of claim 5 including a check valve operatively associated with said central passage for blocking water flow completely through said central passage in one direction extending therethrough.

* * * * *